United States Patent
Mizutani et al.

[11] Patent Number: 5,926,454
[45] Date of Patent: Jul. 20, 1999

[54] DISC CARTRIDGE WITH SLIDE SHUTTER HAVING CATCH PIECES

[75] Inventors: Hikaru Mizutani, Mino; Kenji Ohta, Otokuni-gun, both of Japan

[73] Assignee: Hitachi Maxell, Ltd., Osaka-fu, Japan

[21] Appl. No.: 08/832,489

[22] Filed: Apr. 3, 1997

[30] Foreign Application Priority Data

Apr. 3, 1996 [JP] Japan .................................. 8-108573

[51] Int. Cl.⁶ .............................. G11B 3/70; G11B 23/03
[52] U.S. Cl. ........................................ 369/291; 360/133
[58] Field of Search .............................. 369/291; 360/133

[56] References Cited

U.S. PATENT DOCUMENTS

| | | | |
|---|---|---|---|
| 4,918,559 | 4/1990 | Maruyama et al. | 369/291 |
| 5,570,341 | 10/1996 | Sandell et al. | 369/291 |

FOREIGN PATENT DOCUMENTS

| | | | |
|---|---|---|---|
| 0402037 | 12/1990 | European Pat. Off. | 369/291 |
| 1-319190 | 12/1989 | Japan | 369/291 |
| 3-207066 | 9/1991 | Japan | 369/291 |
| 4-162275 | 6/1992 | Japan | 369/291 |

Primary Examiner—Stuart S. Levy
Assistant Examiner—Kenneth W. Fields
Attorney, Agent, or Firm—Birch, Stewart, Kolasch & Birch, LLP

[57] ABSTRACT

A disc cartridge for freely rotatably accommodating a disc-shaped recording medium has a slide shutter assembly for selectively opening and closing the access window through which a recording and/or reproducing head is accessible to the optical disc accommodated within the cartridge. The slide shutter assembly is of a generally U-shaped configuration including top and bottom shutter plates and a bridge plate connecting the top and bottom shutter plates. While the slide shutter assembly is slidably mounted on a front open portion of the cartridge casing, the bridge plate has an inner surface formed integrally with a plurality of catch pieces. At least one guide plate extends along the front open portion of the cartridge casing between side walls and has a slot defined therein so as to extend lengthwise of the guide plate. With the slide shutter assembly mounted on the front portion of the cartridge casing, the catch pieces are slidably engaged in said slot to avoid an accidental separation of the slide shutter assembly from the cartridge casing.

2 Claims, 4 Drawing Sheets

DISC CARTRIDGE WITH SLIDE SHUTTER HAVING CATCH PIECES

BACKGROUND OF THE INVENTION

1. Field of the Invention

The present invention generally relates to a disc cartridge of a generally rectangular configuration for removably accommodating a disc-shaped recording medium such as, for example, an optical recording disc or a magnetooptical recording disc and, more particularly, to a slide shutter structure for selectively opening and closing an access window through which a recording and/or reproducing head is accessible to the recording medium within the disc cartridge.

2. Description of the Prior Art

The disc cartridge of the type referred to above is disclosed in, for example, the Japanese Laid-open Patent Publication No. 3-280280, published in 1991. According to this publication, the disc cartridge comprises a generally rectangular flattened casing having an access window defined therein for the access of a recording and/or reproducing head to the recording medium. The publication referred to above also discloses the use of a slide shutter mounted on the cartridge casing for sliding movement along one of four sides thereof for selectively opening and closing the access opening.

In this prior art disc cartridge, to mount the slide shutter non-detachably, but slidably on the cartridge casing, the slide shutter is fitted to the cartridge casing by the use of two slide members which are pieces separate from the cartridge casing. The use of the separate slide members has a problem in that not only is the number of the component parts used to fabricate the disc cartridge increased, but the number of assembling steps is also increased. In addition, since the separate slide members are made from a metal sheet as is the case with the slide shutter, the use of the metallic material for the separate slide members tends to result in increase of the cost required to fabricate the disc cartridge as a whole.

SUMMARY OF THE INVENTION

The present invention has accordingly an essential object to provide an improved disc cartridge of a type wherein no separate member such as required in the prior art disc cartridge is employed to mount the slide shutter on the cartridge casing to enable the disc cartridge to be manufactured easily and at a reduced cost.

To this end, the present invention provides a disc cartridge for freely rotatably accommodating a disc-shaped recording medium, which comprises a cartridge casing having top and bottom walls spaced a distance from each other to define a disc chamber for freely rotatably accommodating the recording medium and also having an access window defined therein through which a recording and/or reproducing head is accessible to the recording medium, and a slide shutter assembly slidable in a direction widthwise of the cartridge casing for selectively opening and closing the access window and normally biased to a closed position to close the access window.

The slide shutter assembly is of a generally U-shaped configuration including top and bottom shutter plates and a bridge plate connecting the top and bottom shutter plates together to thereby render the slide shutter assembly to represent the generally U-shaped configuration. The slide shutter assembly is slidably mounted on a front open portion of the cartridge casing with the top and bottom shutter plates resting exteriorly on the top and bottom walls, respectively. The bridge plate has an inner surface formed integrally with a plurality of catch pieces. At least one guide plate extends along the front open portion of the cartridge casing between side walls and has a slot defined therein so as to extend lengthwise of the guide plate. With the slide shutter assembly mounted on the front portion of the cartridge casing, the catch pieces are slidably engaged in said slot to avoid an accidental separation of the slide shutter assembly from the cartridge casing.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which.

DETAILED DESCRIPTION OF THE EMBODIMENTS

Figure 1:
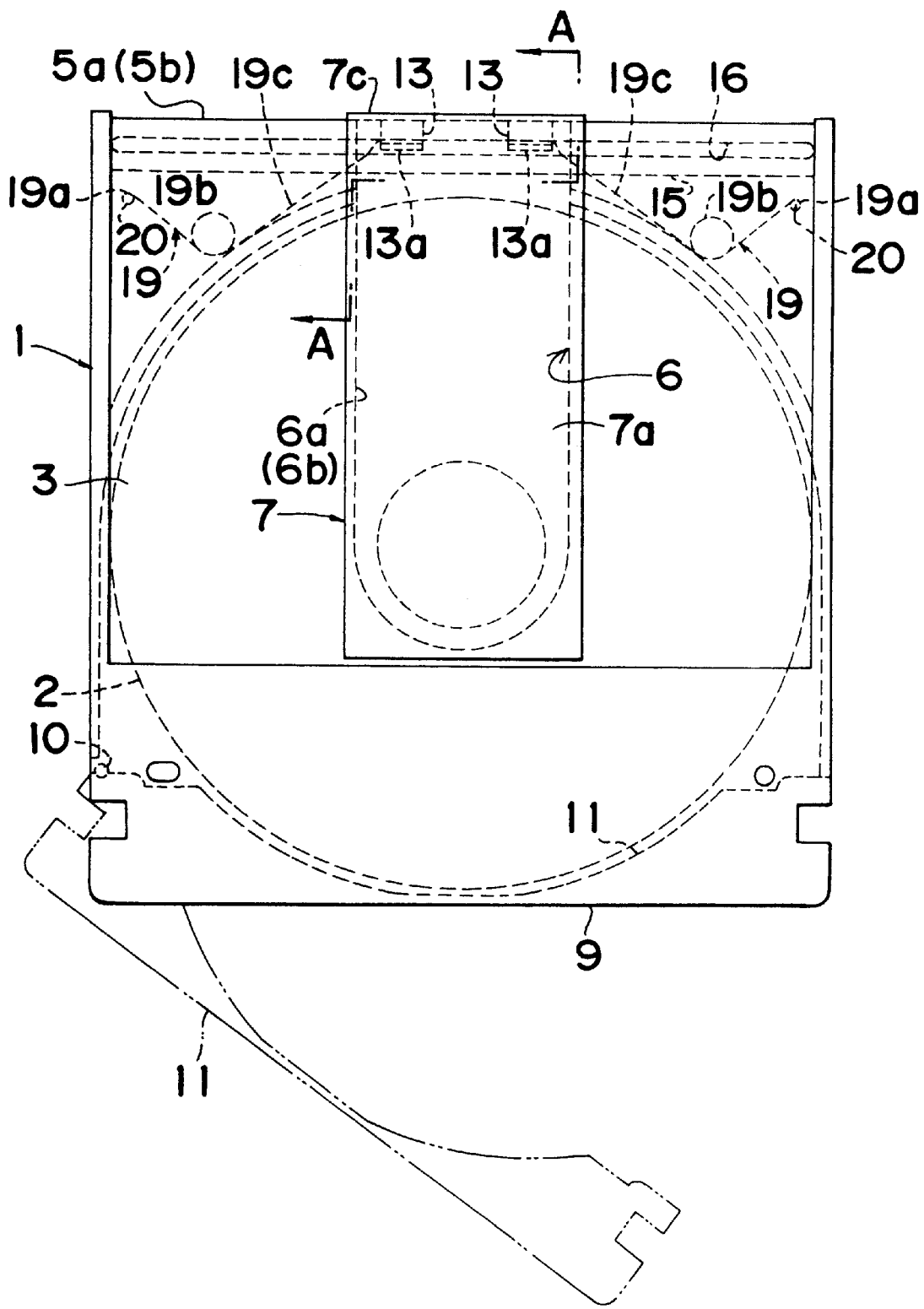
FIG. 1 is a schematic top plan view of a disc cartridge according to a preferred embodiment of the present invention.
Figure 2:
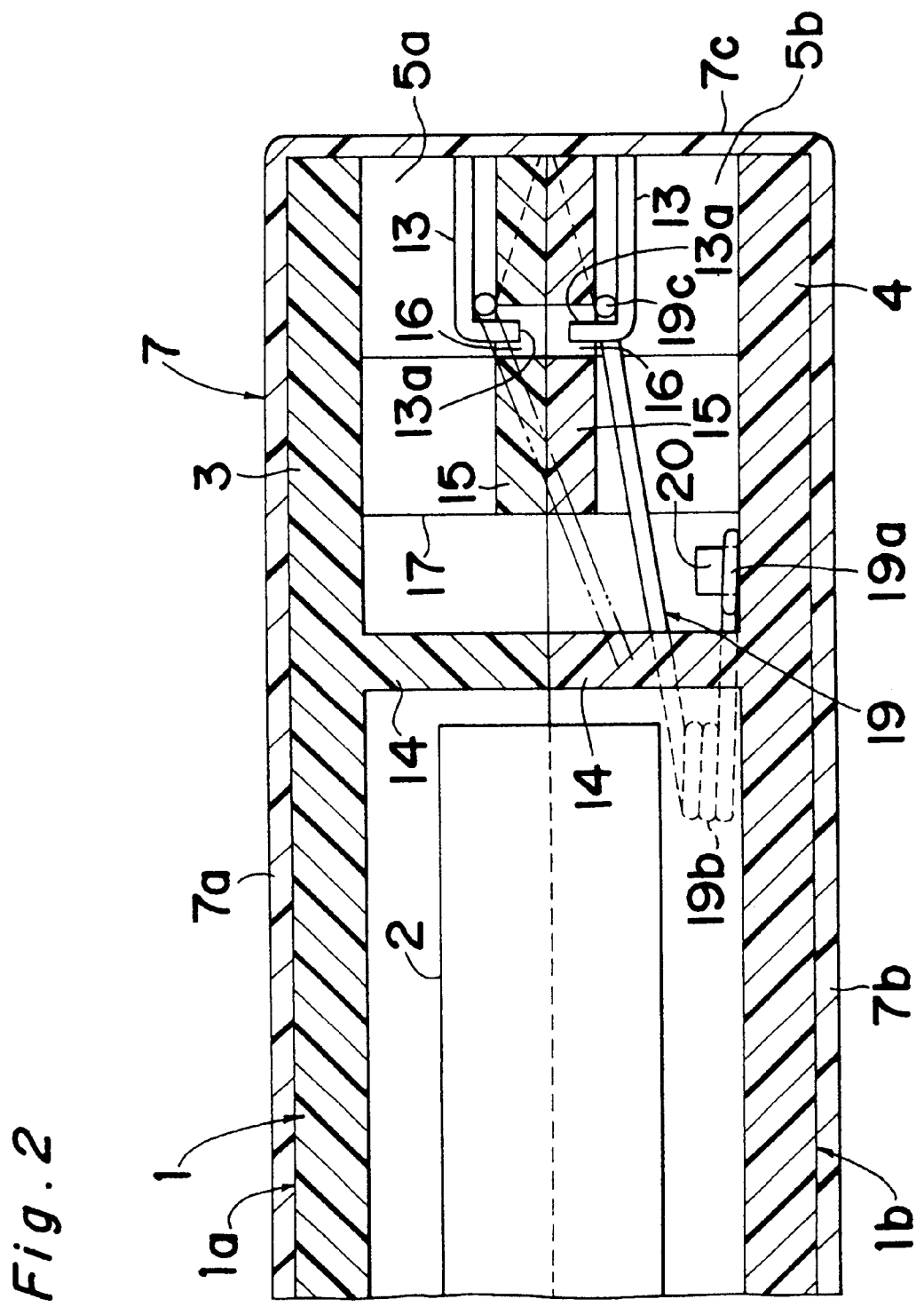
FIG. 2 is a cross-sectional view, on an enlarged scale, taken along the line A—A in FIG. 1.

Referring to the accompanying drawings, particularly to FIGS. 1 and 2, a disc-shaped optical or magnetooptical recording medium is shown in the form of, for example, an optical disc 2 having first and second major surfaces opposite to each other with audio and/or video signals recorded on at least one of the major surfaces thereof. This optical disc 2 is freely rotatably accommodated within a disc cartridge made of a moldable plastic material and including a generally rectangular flattened cartridge casing 1.

The cartridge casing 1 is made up of top and bottom casing halves 1a and 1b joined together to define a disc chamber therebetween, and each casing half 1a or 1b is generally of one-piece structure including a top or bottom wall 3 or 4. It is, however, to be noted that a rear portion of the cartridge casing 1 is depleted to define a disc access opening 9 that is normally closed by a pivot lid 11 pivotable about a pivot pin 10 in a plane substantially parallel to the cartridge casing 1. A portion of each of the top and bottom walls 3 and 4 which extends from a center area of the top or bottom wall 3 or 4 to a front portion of the peripheral wall of the cartridge casing 1 opposite to the pivot lid 11 along an imaginary line drawn intermediate of the width of the disc cartridge is depleted to define a generally rectangular access aperture 6a or 6b for the access of a optical recording and/or reproducing head (not shown) to the optical disc 2 within the disc chamber. The access apertures 6a and 6b so defined in the top and bottom walls 3 and 4, respectively, are aligned with each other to define an access opening 6 that is closed by a slide shutter assembly 7 normally biased to a closed position as will subsequently be described.

Figure 3:
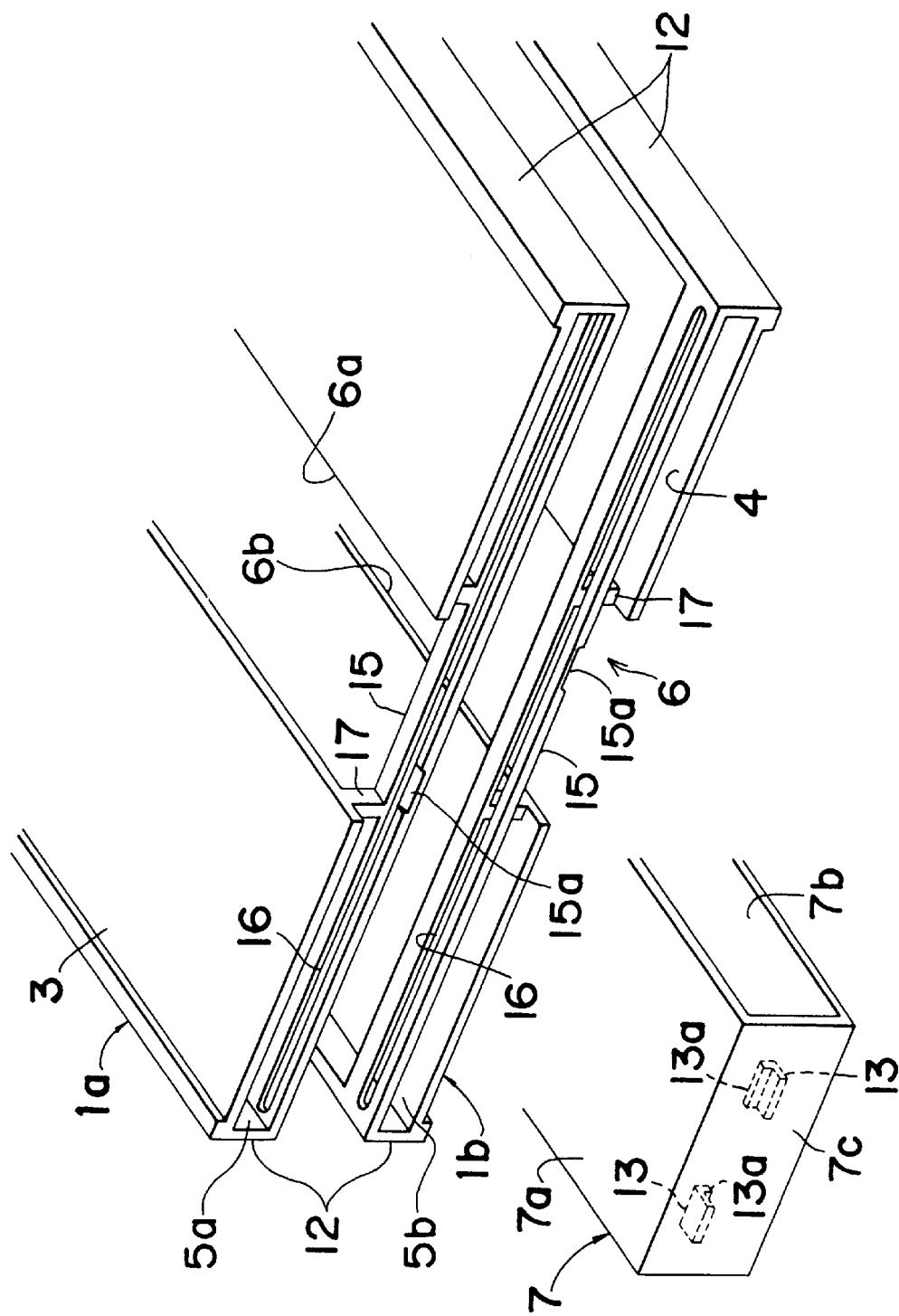
FIG. 3 is a fragmentary perspective view, on an enlarged scale, of a front portion of the disc cartridge, showing how a slide shutter is fitted to the disc cartridge.

FIG. 3 illustrates the structural details of a front portion of each of the top and bottom casing halves 1a and 1b forming the cartridge casing 1. As shown therein, the top casing half 1a includes, in addition 1to the top wall 3, left and right side walls 12 lying perpendicular to the top wall 3, with the access aperture 6a defined in the top wall 3 at a location generally intermediate between the left and right side walls 12 so as to extend from the center area of the top wall 3 towards the front portion thereof in a direction counter to the pivot lid 11. The top wall 3 has an inner surface confronting the bottom wall 4, which is integrally formed with a generally arcuate positioning rib 14 curved to follow the curvature of the optical disc 2 as shown in FIGS. 1 and 2, said positioning rib 14 serving to substantially suppress a free movement of the optical disc 2 within the disc chamber towards the front portion of the cartridge casing 1.

Respective lower front edges of the left and right side walls 12 are connected together by means of an elongated guide plate 15 formed integrally therewith so as to extend therebetween and parallel to the top wall 3, leaving a front open space 5a. This elongated guide plate 15 has a slot 16 defined therein so as to extend a distance corresponding to the length of the elongated guide plate 15. To reinforce the elongated guide plate 15 to thereby avoid an elastic deformation thereof, generally intermediate portions of the guide plate 15 on one side of the slot 16 close towards the center area of the top wall 3 are connected with corresponding front edge portions of the top wall 3 confronting the access aperture 6a by means of connecting ribs 17 as best shown in FIG. 3.

Similarly, the bottom casing half 1b includes, in addition to the bottom wall 4, left and right side walls 12 lying perpendicular to the bottom wall 4, with the access aperture 6b defined in the bottom wall 4 at a location generally intermediate between the left and right side walls 12 so as to extend from the center area of the bottom wall 4 towards the front portion thereof in a direction counter to the pivot lid 11. The bottom wall 4 has an inner surface confronting the top wall 3, which is integrally formed with a generally arcuate positioning rib 14 curved to follow the curvature of the optical disc 2, said positioning rib 14 cooperating with the positioning rib 14 in the top wall 3 to substantially suppress a free movement of the optical disc 2 within the disc chamber towards the front portion of the cartridge casing 1.

Also, respective lower front edges of the left and right side walls 12 of the lower casing half 1b are connected together by means of an elongated guide plate 15 formed integrally therewith so as to extend therebetween and parallel to the top wall 3, leaving a front open space 5b. This elongated guide plate 15 has a slot 16 defined therein so as to extend a distance corresponding to the length of the elongated guide plate 15. To reinforce the elongated guide plate 15 to thereby avoid an elastic deformation thereof, generally intermediate portions of the guide plate 15 on one side of the slot 16 close towards the center area of the bottom wall 4 are connected with corresponding front edge portions of the bottom wall 4 confronting the access aperture 6b by means of connecting ribs 17.

Referring to FIGS. 2 and 3, the slide shutter assembly 7 is of a generally U-shaped configuration prepared by bending a generally rectangular metallic plate made of, for example, stainless steel and includes a top shutter plate 7a adapted to cover the access aperture 6a in the top wall 3, a bottom shutter plate 7b adapted to cover the access aperture 6b in the bottom wall 4, and an bridge plate 7c connecting the top and bottom shutter plates 7a and 7b together. The bridge plate 7c has an inner surface formed integrally with left and right catch pieces 13 of a generally L-sectioned configuration. It is to be noted that the slide shutter assembly 7 although preferred to be made of metal may be made of plastics.

Figure 4:
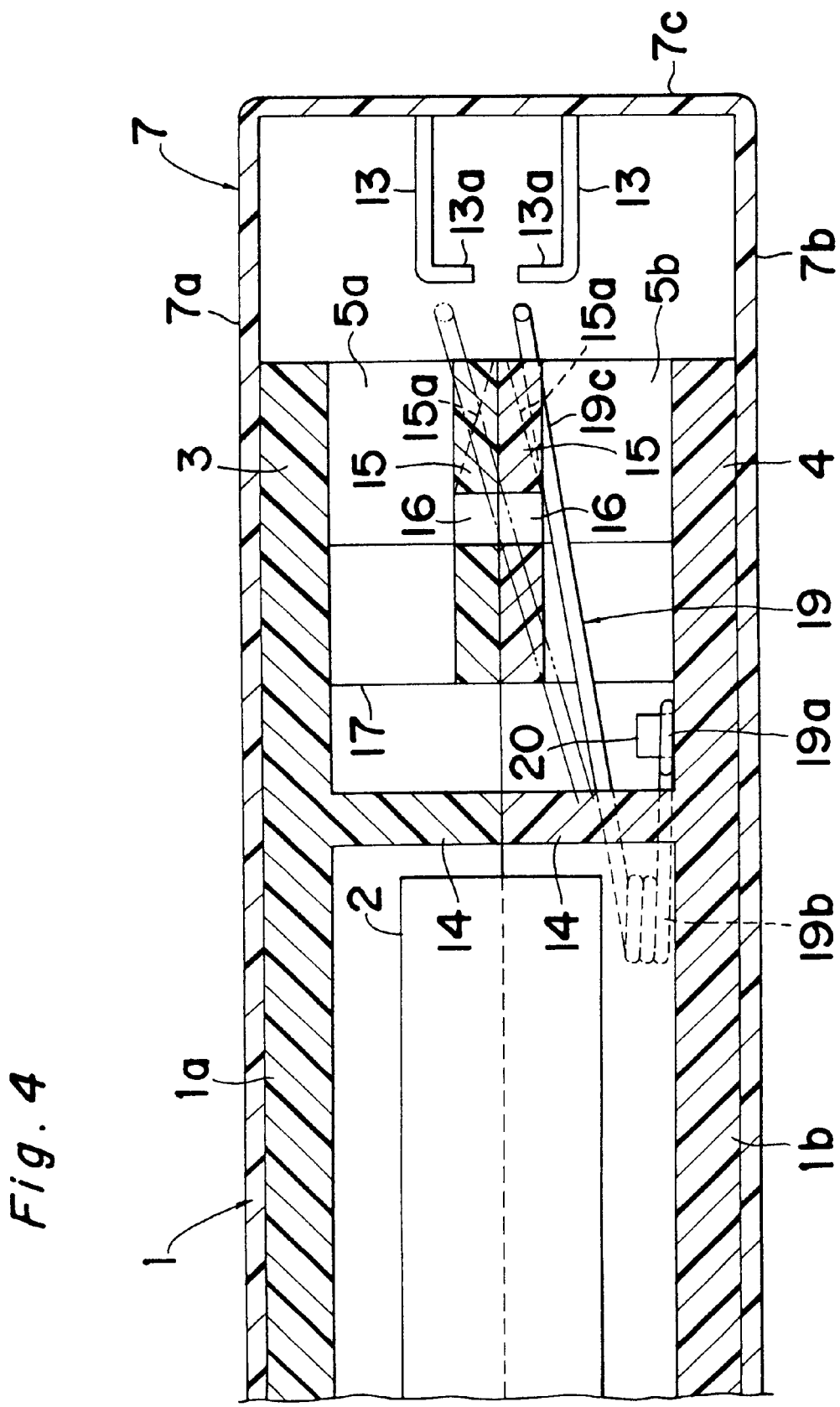
FIG. 4 is a view similar to FIG. 2, showing the slider shutter having been completely mounted on the disc cartridge.

With the casing halves 1a and 1b joined together to complete the cartridge casing 1, the guide plate 15 in the top wall 3 and the guide plate 15 in the bottom wall 4 are joined together with the slots 16 aligned completely with each other as shown in FIG. 4, and the slide shutter assembly 7 is mounted with the front portion of the resultant cartridge casing 1 received within a space delimited by the top and bottom shutter plates 7a and 7b and the bridge plate 7c. In other words, the slide shutter assembly 7 so mounted straddles over the front portion of the cartridge casing 1 with the top and bottom shutter plates 7a and 7b held in position to cover the respective access apertures 6a and 6b. In this assembled condition, the catch pieces 13 each having a transverse pawl 13a are inserted into the upper front open space 5a between the top wall 3 and the guide plate 15 and the lower front open space 5b between the bottom wall 3 and the guide plate 15, respectively, until the transverse pawls 13a are caught in the associated slots 16.

Specifically, as the front portion of the cartridge casing 1 is received in between the top and bottom shutter plates 7a and 7b, the transverse pawls 13a are brought into engagement with the guide plates 15. However, further push of the slide shutter assembly 7 towards the cartridge casing 1 causes the transverse pawls 13a to ride over the guide plates and then onto the slots 16 while causing the guide plates 15 to be elastically deformed to allow passage of the associated transverse pawls 13a before the transverse pawls 13a are completely trapped in the slots 16. Once the slide shutter assembly 7 is mounted on the cartridge casing 1 in the manner described above, the slide shutter assembly 7 is no longer detachable from the cartridge casing 1.

The slide shutter assembly 7 mounted on the cartridge casing 1 is, in the illustrated embodiment, slidable from a closed position as shown in FIG. 1 to any one of left and right open positions defined on respective sides of the closed position. This slide shutter assembly 7 is normally biased to the closed position by means of left and right biasing elements 19 each being employed in the form of a torsional spring. Each of the torsional springs 19 has arms 19a and 19c opposite to each other and a loop portion 19b and is disposed in between the top and bottom walls 3 and 4 with the arm 19a engaged to a stopper pin 20, formed on an inner surface of the bottom wall 4 at a location forwardly of the positioning ribs 14 as shown in FIG. 4, and with the loop portion 19b engaged to respective outer surfaces of the positioning ribs 14.

The opposite arm 19c of each torsional spring 19 is allowed to extend outwardly through the associated front open space 5a or 5b. This arm 19c of each torsional spring 19 is, when the slide shutter assembly 7 is mounted on the front portion of the cartridge casing 1 in the manner described above, brought into engagement with the transverse pawl 13a, having been urged inwardly of the cartridge casing 1 in contact with the transverse pawl 13a. Accordingly, it is clear that the respective arms 19c of the torsional springs 19 apply to the slide shutter assembly 7 through the catch pieces 13 biasing forces acting in respective directions close towards each other such that the slide shutter assembly 7 can be held at the closed position intermediate between the left and right open positions.

It is to be noted that a front edge of each of the guide plates 15 may have an inclined guide face defined at 15a as shown in FIG. 3 so that during mounting of the slide shutter assembly 7 on the front portion of the cartridge casing 1, the associated transverse pawl 13a can slide over the guide plate 15 and then onto the respective slot 16.

Thus, when the slide shutter assembly 7 is slid leftwards or rightwards from the closed position towards one of the open positions against the biasing force of the relevant torsional spring 19, the transverse pawls 13a of the respective catch pieces 13 are moved within and along the slots 16 with the shutter plates 7a and 7b opening the adjacent access apertures 6a and 6b. Release of an external pushing force applied to the slide shutter assembly 7 to move the latter from the opened position causes the slide shutter assembly 7 to quickly return to the closed position by the action of the relevant torsional spring 19.

While in the foregoing embodiment the slide shutter assembly 7 has been described as having the two open positions on respective sides of the closed position, the slide shutter assembly 7 may be designed to move between the closed position and the only open position, in which case one of the torsional springs 19 can be dispensed of.

The guide plates 15 function not only to provide a guide for the catch pieces 13, but also to reinforce a front open portion of the cartridge casing 1. Considering the dual functions of the guide plates 15, the guide plates 15 are preferably bonded together. However, in a broad aspect of the present invention, one of the guide plates 15 integral with the respective top and bottom walls 3 and 4 may not be always essential and may be therefore dispensed of. Similarly, although the use of the two catch pieces 13 is preferred to enable the slide shutter assembly 7 to be supported stably, only one of them may be sufficient if so desired.

Thus, according to the present invention, within an area between the front open portion, defined by the front open spaces 5a and 5b, of the cartridge casing 1 and the outer periphery of the optical disc 2, the guide bar, constituted by the guide plates 15 and having a slot defined therein, is provided so as to extend between the left and right side walls 12 and, on the other hand, the bridge plate 7c of the slide shutter assembly 7 is integrally provided with the catch pieces 13 which are in turn slidably engaged in the slot in the guide bar. Accordingly, the cartridge casing 1 according to the present invention requires no use of catch pieces separate from the slide shutter assembly and can therefore be easily assembled at a reduced cost. Also, since the catch pieces 13 concurrently serve as elements for receiving associated free ends of the torsional springs, the number of required component parts to assemble the cartridge casing can advantageously be reduced.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A disc cartridge for freely rotatably accommodating a disc-shaped recording medium, which comprises:

a cartridge casing having top and bottom walls spaced a distance from each other to define a disc chamber for freely rotatably accommodating the recording medium and also having an access window defined therein through which a recording and/or reproducing head is accessible to the recording medium, said cartridge casing having a front open portion and further having side walls opposite to each other;

a slide shutter assembly slidable in a direction widthwise of the cartridge casing for selectively opening and closing the access window, said slide shutter being normally biased to a closed position by at least one biasing element to close the access window, said slide shutter assembly being of a generally U-shaped configuration including top and bottom shutter plates and a bridge plate connecting the top and bottom shutter plates together, said shutter assembly being slidably mounted on the front open portion of the cartridge casing with the top and bottom shutter plates resting exteriorly on the top and bottom walls, respectively, said bridge plate having an inner surface formed integrally with a plurality of catch pieces that are rigidly connected thereto;

at least one guide plate which is adjacent to the top wall of the cartridge casing and extends between the side walls of the cartridge casing, said guide plate having a slot defined therein so as to extend substantially along the entire length of the guide plate;

wherein said at least one biasing element is interposed between at least one of said plurality of catch pieces and said cartridge casing;

said catch pieces being slidably engaged in said slot to avoid an accidental separation of the slide shutter assembly from the cartridge casing; and wherein the front open portion is an access aperture defined in the top wall at a location intermediate to the side walls and extending to said guide plate.

2. A disc cartridge for free rotatably accommodating a disc-shaped recording medium, which comprises:

a cartridge casing including top and bottom casing halves joined together to define a disc chamber for freely rotatably accommodating the recording medium, each of said top and bottom casing halves having a major wall and side walls perpendicular to the major wall and also having an access aperture defined therein so as to extend from a center area of the major wall to a front portion thereof, said access apertures in the respective major walls of the top and bottom casing halves altogether defining an access window through which a recording and/or reproducing head is accessible to the recording medium, each of said top and bottom casing halves having a front open area;

a slide shutter assembly slidable in a direction widthwise of the cartridge casing for selectively opening and closing the access window, said slide shutter being normally biased to a closed position by at least one biasing element to close the access window, said slide shutter assembly being of a generally U-shaped configuration including top and bottom shutter plates and a bridge plate connecting the top and bottom shutter plates together, said slide shutter assembly being slidably mounted on the front open portion of the cartridge casing with the top and bottom shutter plates resting exteriorly on the top and bottom walls, respectively, said bridge plate having an inner surface formed integrally with a plurality of catch pieces that are rigidly connected thereto;

a pair of elongated guide plates, with each guide plate of said pair extending along the front open portion of the cartridge casing between the side walls of each of the top and bottom casing halves, and each of said guide plates having a slot defined therein so as to extend substantially along the entire length of the guide plate, with said pair of elongated guide plates in said top and bottom casing halves being overlapped one above the other such that the respective slots thereof are aligned with each other;

wherein said at least one biasing element is interposed between at least one of said plurality of catch pieces and said cartridge casing;

each of said catch pieces being of a generally L-sectioned configuration having a traverse pawl, said traverse pawls in said respective catch pieces being slidably engaged in said slot to avoid an accidental separation of the slide shutter assembly from the cartridge casing; and wherein the front open portion is an access aperture defined in the top wall at a location intermediate to the side walls and extending to said guide plate.

* * * * *